(12) United States Patent
Hunter et al.

(10) Patent No.: US 7,818,713 B2
(45) Date of Patent: Oct. 19, 2010

(54) METHOD, SYSTEM AND PROGRAM PRODUCT FOR GENERATING REQUIREMENT RELATIONSHIPS FOR DESIGNING A SOLUTION

(75) Inventors: Janet Page Hunter, Tampa, FL (US); James D. Jamison, III, Aurora, CO (US); Naomi Meiko Mitsumori, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 11/834,231

(22) Filed: Aug. 6, 2007

(65) Prior Publication Data

US 2009/0044168 A1 Feb. 12, 2009

(51) Int. Cl.
*G06F 9/44* (2006.01)
(52) U.S. Cl. .................................... 717/100
(58) Field of Classification Search ............... 717/100
See application file for complete search history.

(56) References Cited

U.S. PATENT DOCUMENTS

| | | | |
|---|---|---|---|
| 7,389,490 B2 * | 6/2008 | Roesner et al. | 717/104 |
| 7,395,524 B2 * | 7/2008 | Roesner et al. | 717/114 |
| 7,509,629 B2 * | 3/2009 | Sakamoto et al. | 717/100 |
| 2004/0024624 A1 | 2/2004 | Ciscon et al. | |
| 2004/0148586 A1 | 7/2004 | Gilboa | |
| 2005/0055667 A1 | 3/2005 | Beringer et al. | |
| 2005/0160103 A1 | 7/2005 | Raffo | |
| 2006/0015382 A1 | 1/2006 | Beringer | |
| 2006/0037019 A1 | 2/2006 | Austin et al. | |
| 2006/0059027 A1 | 3/2006 | Berenbach et al. | |
| 2006/0174222 A1 * | 8/2006 | Thonse et al. | 717/106 |

OTHER PUBLICATIONS

Alcazar et al. "A Process Framework for Requirements Analysis and Specification", 2000, TCP Sistemas e Ingenieria.*
Konrad et al. "Requirements Patterns for Embedded Systems", Sep. 2002, Michigan State University.*
Hall, J. G. et al., "Relating Software Requirements and Architectures", IEE Proceedings-Software, vol. 152, issue No. 4, Aug. 2005, pp. 141-142.
Hall, J. G. et al., "Relating Software Requirements and Architectures Using Problem Frames", Requirements Engineering, 2002. Proceedings. IEEEJoint International Conference on Sep. 9-13, 2002, pp. 137-144.

* cited by examiner

*Primary Examiner*—Wei Y Zhen
*Assistant Examiner*—Junchun Wu
(74) *Attorney, Agent, or Firm*—John R. Pivnichny; Law Office of Jim Boice

(57) ABSTRACT

A method, system and program product for generating requirement patterns for designing a domain based solution. The method includes inputting, into a pattern tool, requirements for designing a solution based on a defined domain context, the requirements including attributes and specifications. The method further includes determining relationship requirement patterns using relationship mappings formed by mapping specifications to an attribute and defining affinities for the relationship mappings formed. Further, the method includes creating domain requirement patterns using the domain context defined, the relationship mappings formed and the affinities defined and generating domain trait requirement patterns using the domain requirement patterns created and using selected values assigned to the specifications mapped, such that the domain trait requirement patterns generated dictate a domain specific design for the solution. Furthermore, the method includes storing attributes, specifications, relationship requirement patterns, domain requirement patterns and domain trait requirement patterns in a repository.

25 Claims, 10 Drawing Sheets

900 ⟶

TABLE 1 RELATIONSHIP REQUIREMENT PATTERN

| RELATIONSHIP MAPPING (RM, FOR M ATTRIBUTES BY N SPECIFICATIONS), WHERE Y = RELATIONSHIP EXISTS, N = NO RELATIONSHIP EXISTS) | | SPECIFICATION NAME | | | |
|---|---|---|---|---|---|
| | | SPECIFICATION_1 952 | SPECIFICATION_2 954 | ... | SPECIFICATION_N 990 |
| ATTRIBUTE NAME | ATTRIBUTE_1 902 | $RM_{a1,s1}$ =Y 992 | $RM_{a1,s2}$ =N | ... | $RM_{a1,sN}$ =Y |
| | ATTRIBUTE_2 904 | $RM_{a2,s1}$ =N | $RM_{a2,s2}$ =Y | ... | $RM_{a2,sN}$ =N |
| | ⋮ | ... | ... | ... | ... |
| | ATTRIBUTE_M 950 | $RM_{aM,s1}$ =N | $RM_{aM,s2}$ =N | ... | $RM_{aM,sN}$ =Y |

TABLE 2 DOMAIN REQUIREMENT PATTERN

| DOMAIN REQUIREMENT AFFINITY | | SPECIFICATION NAME | | | |
|---|---|---|---|---|---|
| | | SPECIFICATION_1 1052 | SPECIFICATION_2 1054 | ... | SPECIFICATION_N 1090 |
| ATTRIBUTE NAME | ATTRIBUTE_1 1002 | $AV^*RM_{a1,s1}$ 1092 | $AV^*RM_{a1,s2}$ | ... | $AV^*RM_{a1,sN}$ |
| | ATTRIBUTE_2 1004 | $AV^*RM_{a2,s1}$ | $AV^*RM_{a2,s2}$ | ... | $AV^*RM_{a2,sN}$ |
| | ⋮ | ... | ... | ... | ... |
| | ATTRIBUTE_M 1050 | $AV^*RM_{aM,s1}$ | $AV^*RM_{aM,s2}$ | ... | $AV^*RM_{aM,sN}$ |

TABLE 3 TRAIT REQUIREMENT PATTERN

| TRAIT VALUE MAPPING (TV, FOR M ATTRIBUTES, BY N SPECIFICATIONS WITH (SPECIFIC_VALUE) CORRESPONDING TO A RELATIONSHIP MAPPING | | SPECIFICATION NAME | | | |
|---|---|---|---|---|---|
| | | SPECIFICATION_1 1152 | SPECIFICATION_2 1154 | ... | SPECIFICATION_N 1190 |
| ATTRIBUTE NAME | ATTRIBUTE_1 1102 | $TV_{a1,s1}$ 1192 | $TV_{a1,s2}$ | ... | $TV_{a1,sN}$ |
| | ATTRIBUTE_2 1104 | $TV_{a2,s1}$ | $TV_{a2,s2}$ | ... | $TV_{a2,sN}$ |
| | ⋮ | ... | ... | ... | ... |
| | ATTRIBUTE_M 1150 | $TV_{aM,s1}$ | $TV_{a2,s2}$ | ... | $TV_{aM,sN}$ |

FIG. 11

METHOD, SYSTEM AND PROGRAM PRODUCT FOR GENERATING REQUIREMENT RELATIONSHIPS FOR DESIGNING A SOLUTION

FIELD OF THE INVENTION

The present invention relates to the field of computer systems and software and more specifically to a method, system and computer program product for generating requirement relationships when designing a solution.

BACKGROUND OF THE INVENTION

In today's business environment, an organization and/or business has to invest considerable resources in developing solutions, such as, an information technology solution. Functional and nonfunctional requirements necessary to develop a solution are identified and then implemented into a solution. Often defects in the requirements (requirement defects) are not detected until the testing and initial deployment phases, which results in higher costs, delays to schedules and low customer satisfaction. As such, there is a need to develop an efficient and effective way of developing solutions, so that any requirement defects can be detected earlier in the development stages of a solution and can provide a business with a cost-effective way of developing a solution that captures the necessary requirements.

SUMMARY OF THE INVENTION

In a first aspect of the invention, there is provided a method for generating requirement patterns for designing a solution based on a domain context. The method includes inputting, into a pattern tool, requirements for designing a solution based on a domain context defined, the requirements inputted includes a defined set of attributes and a defined set of specifications for designing the solution based on the domain context defined, determining relationship requirement patterns using relationship mappings formed between the defined set of specifications and the defined set of attributes inputted and defining affinities for the plurality of relationship mappings formed. Further, the method includes creating domain requirement patterns using the domain context defined and using the relationship mappings formed and the affinities defined and generating domain trait requirement patterns using the domain requirement patterns created and using selected values assigned for the defined set of specifications mapped, wherein the domain trait requirement patterns generated dictate a domain specific design for the solution. Furthermore, the method includes storing in a repository, the defined set of attributes, the defined set of specifications, the relationship requirement patterns determined, the domain requirement patterns created and the domain trait requirement patterns generated. In an embodiment, the inputting step further includes defining the domain context that the solution is to be used in, the domain context defined comprising one or more sub-domains, assigning a valid range of specification values for each of the defined set of specifications inputted for the domain context that the solution is to be used in, defining the attributes based on the domain context defined for the solution and storing the domain context defined, the valid range of specification values assigned for the defined set of specifications and the attributes defined in the repository. In an embodiment, the determining step further includes mapping one or more specifications of the defined set of specifications to each attribute of the defined set of attributes inputted to form the relationship mappings and storing the relationship mappings formed in the repository. In an embodiment, the defining affinities step further includes establishing affinity values for the affinities defined based on the domain context defined and the relationship requirement patterns determined and storing the affinity values established in the repository. In an embodiment, each of the relationship requirement patterns determined, each of the domain requirement patterns generated and each of the domain trait requirement patterns generated are each assigned a primary key index represented and stored as a string.

In another aspect of the invention, there is provided a system for generating requirement patterns for designing a domain specific solution. The system includes a user interface configured to receive requirements for designing a domain-specific solution based on a domain context defined, the requirements includes a plurality of attributes defined and a plurality of specifications defined and a processor configured to execute processing functions and to coordinate a plurality of activities and events for designing the domain specific solution for the domain context defined. Further, the system includes a requirements pattern generator module configured to use pattern matching techniques on the requirements received for creating relationship requirement patterns using relationship mappings formed between the plurality of attributes and the plurality of specifications and to create domain requirement patterns based on the domain context defined and using affinities defined for the plurality of relationship mappings formed for the domain specific solution, a trait pattern generator module configured to use pattern matching techniques to generate domain trait requirement patterns using the domain requirement patterns created and using specific specification values selected from a valid range of specification values assigned to one or more of the plurality of specifications defined based on the domain context defined for the domain specific solution and an interconnect module configured to interconnect each of the user interface, the processor, the requirements pattern generator module and the trait pattern generator module for enabling data exchange. The system further includes a repository configured to store the plurality of attributes defined, the plurality of specifications defined, the domain context defined, the relationship requirement patterns created, the domain requirement patterns created and the domain trait requirement patterns generated. In an embodiment, the system includes a domain definition module configured to receive input for defining the domain context that the domain specific solution is to be used in, a specification definition module configured to receive input for defining the plurality of specifications, including assigning the valid range of specification values for the one or more of the plurality of specifications and an attribute definition module configured to receive input for defining the plurality of attributes. In an embodiment, the one or more specifications of the plurality of specifications are mapped to an attribute of the plurality of attributes to form the relationship mappings. In an embodiment, the requirements pattern generator module is further configured to define the affinities for the plurality of relationship mappings formed and to establish affinity values for the affinities defined based on the domain context defined for creating the domain requirement patterns for the domain specific solution. In an embodiment, the trait pattern generator module is further configured to select the specific specification values from the valid range of specification values assigned for the one or more of the plurality of specifications and to use the specific specification values selected for generating the domain trait requirement patterns that dictate the domain specific solution.

In yet another aspect of the invention, there is provided a computer program product for generating requirement patterns used for designing a domain specific solution. The computer program product includes a computer readable medium, first program instructions to determine, using pattern matching techniques, relationship requirement patterns from requirements inputted for designing a domain specific solution, the requirements inputted including a domain context, a plurality of attributes and a plurality of specifications, the first program instructions including instructions to form relationship mappings between the plurality of attributes and the plurality of specifications and second program instructions to define affinities for the relationship mappings formed and applying the affinities defined to create domain requirement patterns using the domain context, the second program instructions including instructions to establish affinity values for the affinities defined based on the domain context for creating the domain requirement patterns. Further, the computer program product includes third program instructions to generate domain trait requirement patterns using the domain requirement patterns created and using specific specification values selected from a valid range of specification values assigned to one or more of the plurality of specifications and fourth program instructions to store in a repository the domain context, the plurality of attributes, the plurality of specifications, the affinities, the relationship requirements patterns determined, the domain requirement patterns created and the domain trait requirement patterns generated, wherein the domain trait requirement patterns generated dictate the domain specific design for the solution. In an embodiment, the first program instructions include instructions to define the domain context, the plurality of attributes and the plurality of specifications and to map one or more specifications of the plurality of specifications to each attribute of the plurality of attributes to form the relationship mappings used to determine the relationship requirement patterns. In an embodiment, the third program instructions include instructions to select the specific specification values from the valid range of specification values assigned for the one or more specifications of the plurality of specifications and to use the specific specification values selected for generating the domain trait requirement patterns that dictate the domain specific solution. In an embodiment, a relationship requirement pattern determined, a domain requirement pattern generated and a domain trait requirement pattern generated are each assigned a primary key index represented and stored as a string. In an embodiment, the domain context defined includes one or more sub-domains that are defined and stored within the repository. Preferably, the first, second, third and fourth program instructions are recorded on the computer readable medium.

Further, in yet another aspect of the invention, there is provided a process for deploying computing infrastructure includes integrating computer-readable code into a computing system, wherein the code in combination with the computing system is capable of performing a process for designing a domain specific solution. The process includes receiving requirements for designing a solution based on a domain context defined, the requirements received includes a defined set of attributes and a defined set of specifications for designing the solution based on the domain context defined and determining, using pattern matching techniques, relationship requirement patterns using relationship mappings formed between the defined set of specifications and the defined set of attributes inputted. Further, the process includes defining affinities for the plurality of relationship mappings formed, creating domain requirement patterns using the domain context defined and using the relationship mappings formed and the affinities defined, generating domain trait requirement patterns using the domain requirement patterns created and using selected values assigned for the defined set of specifications mapped, wherein the domain trait requirement patterns generated dictate a domain specific design for the solution and storing in a repository the defined set of attributes, the defined set of specifications, the relationship requirement patterns determined, the domain requirement patterns created and the domain trait requirement patterns generated. In an embodiment, the receiving step further includes defining the domain context that the solution is to be used in, the domain context defined including one or more sub-domains, assigning a valid range of specification values for each of the defined set of specifications inputted for the domain context defined that the solution is to be used in, defining the attributes based on the domain context defined for the solution and storing the domain context defined, the valid range of specification values assigned and the attributes defined in the repository. In an embodiment, the determining step further includes mapping the one or more specifications to each attribute of the defined set of attributes inputted to form relationship mappings and storing the relationship mappings formed in the repository. In an embodiment, the defining affinities step further includes establishing affinity values for the affinities defined based on the domain context defined and the relationship requirement patterns determined and storing the affinity values established in the repository. In an embodiment, a relationship requirement pattern determined, a domain requirement pattern generated and a domain trait requirement pattern generated are each assigned a primary key index represented and stored as a string.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 9 is a table illustrating a matrix or an array representing relationship mappings for M number of attributes by N number of specifications used by the requirement pattern generator (RPG) tool for designing a solution, in accordance with an embodiment of the invention.

FIG. 10 is a table illustrating a matrix or an array representing domain requirement patterns used by the requirement pattern generator (RPG) tool for designing a solution, in accordance with an embodiment of the invention.

FIG. 11 is a table illustrating a matrix or an array representing trait requirement patterns used by the requirement pattern generator (RPG) tool for designing a solution, in accordance with an embodiment of the invention.

DETAILED DESCRIPTION OF THE INVENTION

Figure 1:
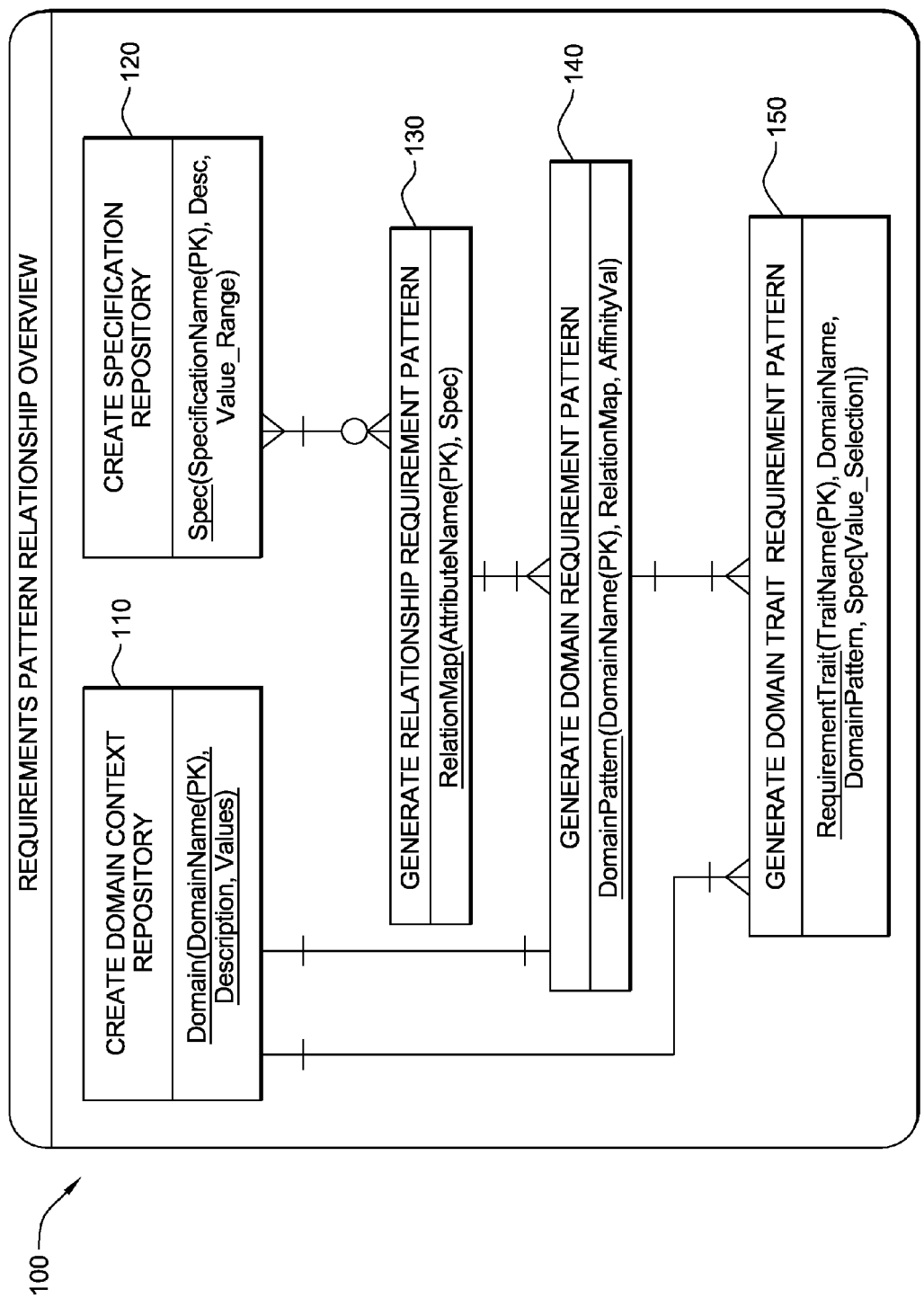
FIG. 1 depicts a flowchart which outlines the overview steps for generating requirements pattern relationships for designing a solution, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices, over disparate memory devices and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a method for generating requirement relationships for designing a solution. The method comprises inputting, into a pattern tool, requirements for designing a solution based on a domain context defined, the requirements inputted comprises a defined set of attributes and a defined set of specifications for designing the solution based on the domain context defined, determining relationship requirement patterns using relationship mappings formed between the defined set of specifications and the defined set of attributes inputted and defining affinities for the plurality of relationship mappings formed. Further, the method comprises creating domain requirement patterns using the domain context defined and using the relationship mappings formed and the affinities defined and generating domain trait requirement patterns using the domain requirement patterns created and using selected values assigned for the defined set of specifications mapped, wherein the domain trait requirement patterns generated dictate a domain specific design for the solution. Furthermore, the method comprises storing in a repository, the defined set of attributes, the defined set of specifications, the relationship requirement patterns determined, the domain requirement patterns created and the domain trait requirement patterns generated. In an embodiment, the inputting step further comprises defining the domain context that the solution is to be used in, the domain context defined comprising one or more sub-domains, assigning a valid range of specification values for each of the defined set of specifications inputted for the domain context that the solution is to be used in, defining the attributes based on the domain context defined for the solution and storing the domain context defined, the valid range of specification values assigned for the defined set of specifications and the attributes defined in the repository. In an embodiment, the determining step further comprises mapping one or more specifications of the defined set of specifications to each attribute of the defined set of attributes inputted to form the relationship mappings and storing the relationship mappings formed in the repository. In an embodiment, the defining affinities step further comprises establishing affinity values for the affinities defined based on the domain context defined and the relationship requirement patterns determined and storing the affinity values established in the repository. In an embodiment, a relationship requirement pattern determined, a domain requirement pattern generated and a domain trait requirement pattern generated are each assigned a primary key index represented and stored as a string.

Reference is now made to FIGS. 1 through 6, which together illustrate a method or process of generating requirement patterns for designing a solution, in accordance with an embodiment of the invention. Turning to FIG. 1, reference numeral 100 depicts an overview of the method for generating pattern relationships for designing a solution based on a given domain context, in accordance with an embodiment of the invention. As shown in step 110, a domain context repository is created, which stores data and information pertaining to a specific domain context for designing a solution based on that specific domain, including a domain name, description and any values associated with the domain. Further, a specification repository is created in step 120, which stores data and information pertaining to specifications, including the specification name, descriptions and any value ranges that are assigned for a given specification (or Spec). The creation of the domain context repository is discussed further herein below with respect to FIG. 2, whereas the creation of the specification repository will be further discussed herein below with respect to FIG. 3. In step 130, a relationship requirement pattern is generated using the data and information stored in the specification repository created in step 120. The generation or creation of the relationship requirement pattern is discussed herein below with respect to FIG. 4. In step 140 a domain requirement pattern is generated using the information and data stored in the domain context repository (in step 110) and using the relationship requirement pattern generated in step 130. The generation of the domain requirement pattern will be discussed further herein below with respect to FIG. 5. In step 150, a domain trait requirement pattern (also referred to as "RequirementTrait" or "TraitPattern" is generated, which uses data and information stored in the domain context repository created in step 110 as well as the domain requirement pattern generated in step 140. The generation of the domain trait requirement pattern will be discussed herein below with respect to FIG. 6.

Figure 2:
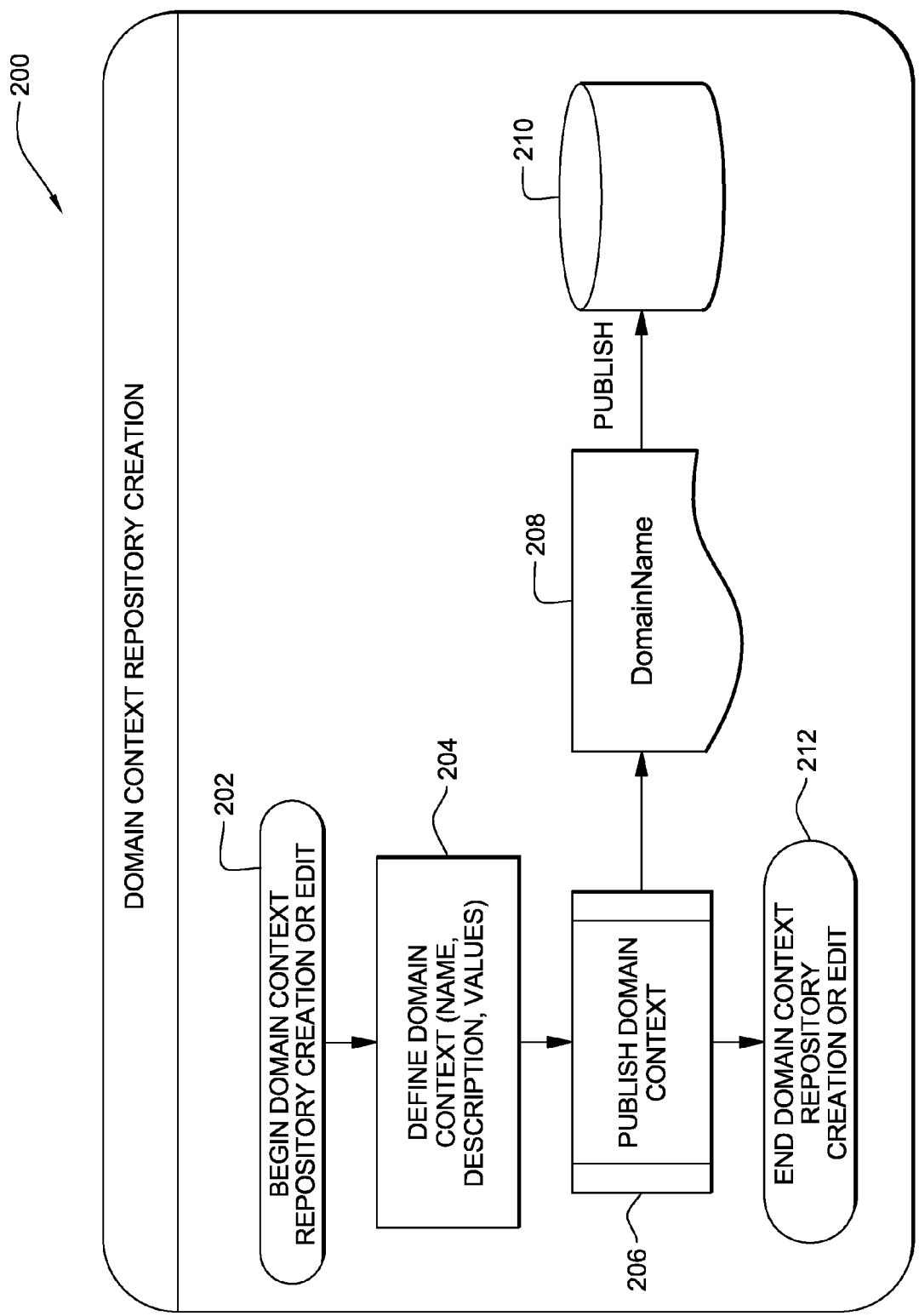
FIG. 2 depicts a flowchart outlining the steps for creating a domain context repository used for generating requirements pattern relationships for designing a solution, in accordance with an embodiment of the present invention.

Referring to FIG. 2, reference numeral 200 outlines the method steps involved in creating a domain context repository for generating requirement patterns for designing a solution for a given domain context or domain, in accordance with an embodiment of the invention. The method begins at step 202 when a user chooses or selects to create a domain context repository or to edit an existing domain context repository. In step 204, a user creating a domain context defines a name for the domain, as well as provides or enters a description of the domain and enters values for the domain description. For example, a domain name that may be created or inputted by a user is "NAICS", whereas, the domain description entered may be "North American Industry Classification System". Further, the value for the domain description entered may be "111" for "Crop Production" or may be "23" for "Construction". Another example of a domain name that may be inputted is "APQC Process", whereas, the domain description entered may be "American Production & Quality Control Process Classification Framework". Further, the value for the domain description entered may be "3.0", which represents "Market and Sell Products and Services" or the value "8.0", which represents "Manage Financial Resources". Once the user has entered or defined the domain name, description and values in step 204, the user runs the PublishDomainContext program or module in step 206, which creates a DomainName in step 208 and publishes the DomainName, which is stored in a domain context repository or storage 210. Similarly, if a user wants to edit or change an existing domain context, the user redefines the domain name, description and value in step 204 and then runs the PublishDomainContext program or module in step 206, which creates an edited or modified DomainName in step 208 and publishes the edited DomainName, which is stored in the domain context repository or storage 210. The process of creating or editing the domain context repository ends in step 212. In an embodiment, each domain inputted, which includes the domain name, description and values is represented and stored as a string and is further assigned a unique Primary Key (PK) for indexing purposes. In an embodiment, a user can generate requirement patterns based on several or compound domains (versus a single domain), for instance, a user may select a domain that includes the domain name of "CPEM", a domain description of "Computer & Peripheral Equipment Manufacturing" and a value represented by "334" and can further select a sub-domain name of "SOM", having a sub-domain description of "Sales Order Management" that is represented by the value of "3.6". Further, the process can be applied to any domain, regardless of whether the domain is technology-related or industry-related. For instance, a domain name created may be "MA" with a domain description of "Major Appliances" having a domain value, for instance, "1000". Furthermore, there may be a sub-domain associated with the domain name "MA", such as, "APP" having a sub-domain description of "Appliances". Further yet, there may be yet another sub-domain associated with the "APP" sub-domain, such as, "REF" with a sub-domain description of "Refrigerators". Again, sub-domain values are entered for each of these sub-domains. Accordingly, the invention may be used for any domain for which a solution is being designed.

Figure 3:
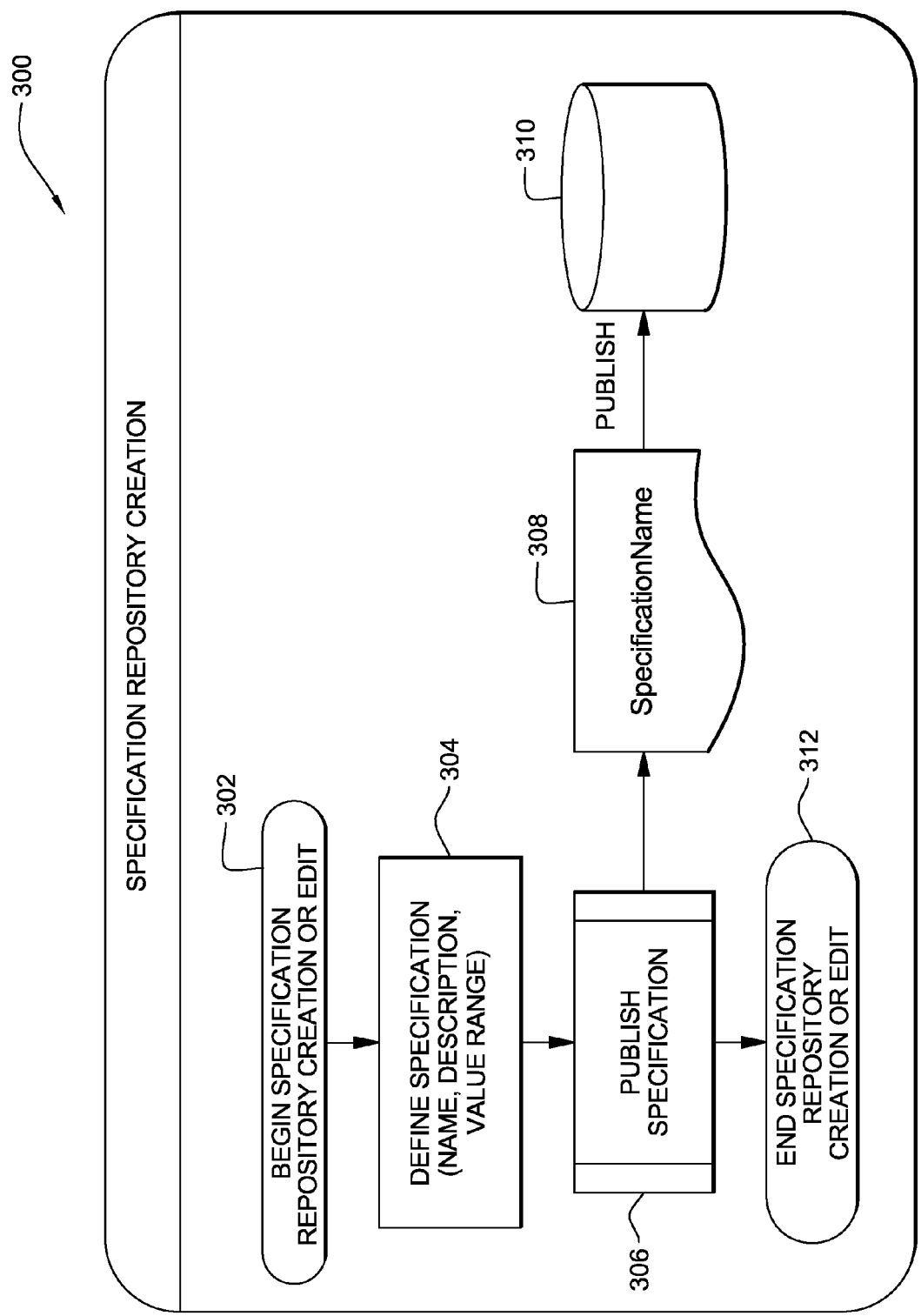
FIG. 3 depicts a flowchart outlining the steps for creating a specification repository used for generating requirements pattern relationships for designing a solution, in accordance with an embodiment of the present invention.

Turning to FIG. 3, reference numeral 300 outlines the method steps involved in creating a specification repository for generating requirement patterns for designing a solution for a given domain context, in accordance with an embodiment of the invention. The method begins at step 302 when a user chooses or selects to create or define a specification in the specification repository or to edit an existing specification stored in the specification repository. In step 304, a user creating a specification defines a name for the specification (SpecificationName), as well as provides or enters a description of the specification and enters a value range for the specification description entered. For example, one specification name created for the domain "Sales Order Management" may be "Data Update start time", which may have a specification description of "single value representing the expected time data update begins", with the specification value representing, for example, a single hour or a range of hours. Further, another specification name created may be "Data Update end time", which may have a specification description of "single value representing the expected time data update ends", with the specification value representing, for example, a single hour or a range of hours. Similarly, in the sub-domain of "refrigerators" a specification name created may be "size" with a specification description of "multi value selection that identifies size" and the specification value may be a range of valid values for size. Another specification name that may be created or inputted by a user is "location type", whereas, the specification description entered may be "geography" or "country". Further, the value range entered for the specification description of "geography" may be "North America, South America, Asia, Europe, Antarctica, Africa, etc.", whereas, the value entered for the specification of "country" may be "United States, Canada, United Kingdom, Norway, Saudi Arabia, China, etc." Once the user has entered or defined the specification name, description and values in step 304, the user runs the PublishSpecification program or module in step 306, which creates a SpecificationName in step 308 and publishes the SpecificationName having associated with it a description and a value range, which is stored in a specification repository or storage 310. Similarly, if a user wants to edit or change an existing specification, the user redefines the specification name, description and value range in step 304 and then runs the PublishSpecification program or module in step 306, which creates an edited or modified SpecificationName in step 308 and publishes the edited SpecificationName, description and value range, which are stored in the specification repository or storage 310. The process of creating or editing the specification repository ends in step 312. In an embodiment, each specification inputted, which includes the specification name, description and a value range is represented and stored as a string and is further assigned a unique Primary Key (PK) for indexing purposes. Accordingly, a specification with the same specification name, but a different range of values would be assigned a different PK.

Figure 4:
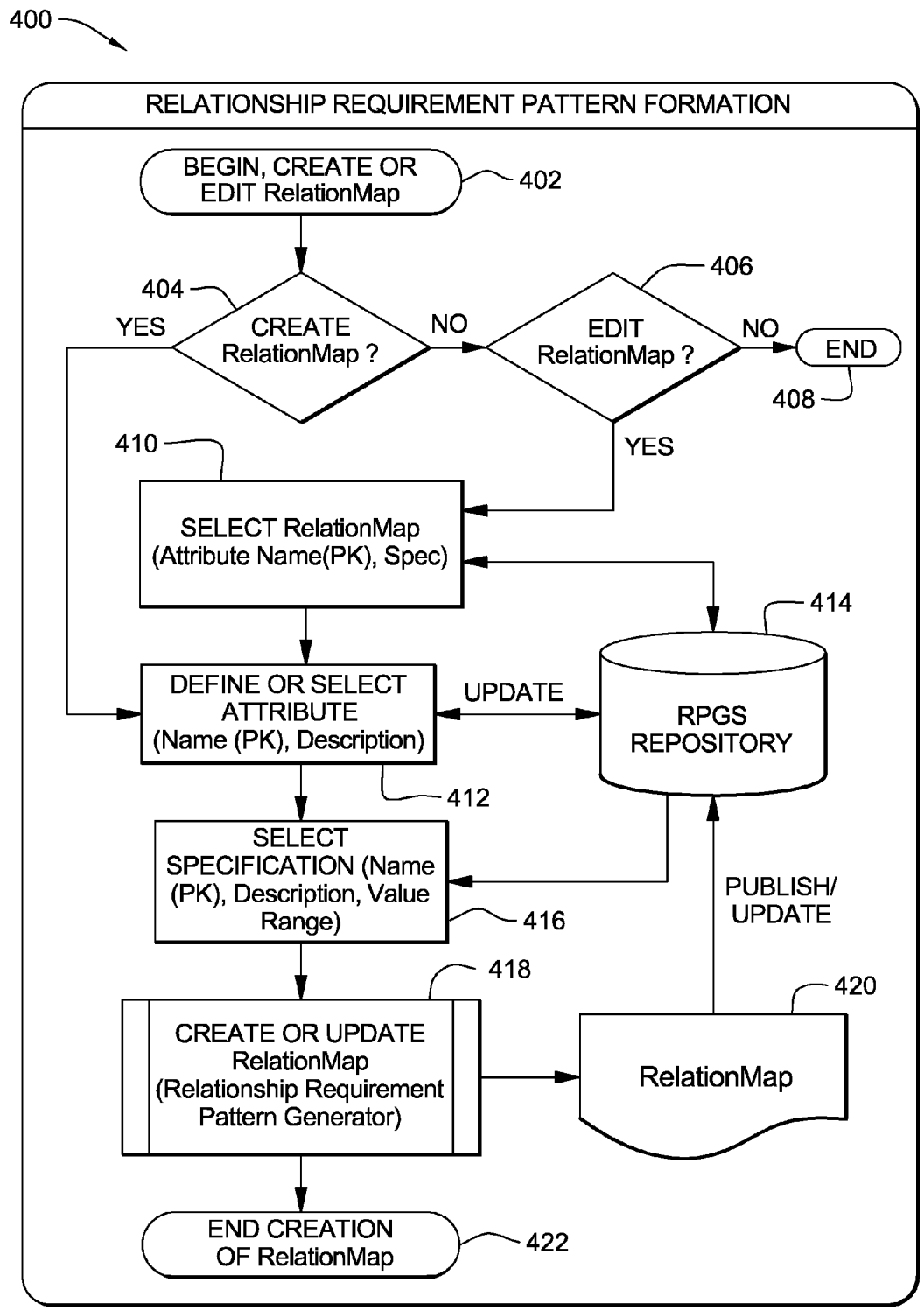
FIG. 4 depicts a flowchart outlining the steps for creating or forming a relationship requirement pattern used for designing a solution, in accordance with an embodiment of the present invention.

Once the domain context repository and the specification repository have been created or defined, the relationship requirement pattern can be formed or generated that relates or maps an attribute with specifications inputted for a given domain context, as explained herein above. Turning to FIG. 4, reference numeral 400 outlines a method for generating or forming a relationship requirement pattern for designing a solution for a given domain context, in accordance with an embodiment of the invention. The method begins at step 402 when a user chooses to create a relationship requirement pattern between an attribute and a specification, referred to as a "RelationMap", or to edit an existing RelationMap, using a requirement pattern generator tool or program or module, as will be discussed further with respect to FIG. 7. In step 404, a determination is made using the requirement pattern generator module in step 404 as to whether or not a user wishes to create a RelationMap. If the user wishes to create a RelationMap in step 412, then the user defines in step 412 an attribute name (as well as assigns, in an embodiment, a Primary Key or PK to the attribute) and an attribute description, which is then updated in the RPGS repository 414. For instance, a user may create or define an attribute of "Telesales Rep" for a domain of "Market and Sell Products and Services", which may be given the attribute description of "Responsible for converting phone calls, e-mail requests and Web requests to sales orders". Further, an attribute created or defined for a domain or sub-domain of "Refrigerators" may be "Doors" and the attribute description may be "single door or double-doors". Accordingly, the user defines one or more attributes for a specific domain in step 412. Further, in step 416, the user selects a specification that has been defined (as described herein above with respect to FIG. 2) and stored in the RPGS repository 414. For instance, a user may select for the attribute "Telesales Rep" a specification of "Location Type" with a specification description of "country" and with a specification value "United States". Similarly, for an attribute of "double doors" for a refrigerator, the user may select a specification of "size", for instance, "extra-large" having a range of specification values, for instance, "60 inches to 80 inches high". In step 418, the requirement pattern generator module is run in order to create a RelationMap, which is published in step 420. The created RelationMap is stored in the RPGS repository 414, ending the process of forming a relationship requirement pattern in step 422. In an embodiment, the RPGS repository includes an attribute repository that includes an attribute name and an attribute description. Referring back to step 404, if the user does not wish to create a RelationMap, then the requirement pattern generator module determines in step 406 whether or not the user wishes to edit an existing RelationMap. If the user does not wish to edit a RelationMap in step 406, then the relationship requirement pattern formation ends in step 408. However, if the user wishes to edit an existing RelationMap the user selects a RelationMap in step 410, the RelationMap being represented by an attribute name and a specification (Spec) that has been previously created and stored in the RPGS repository 414. In an embodiment, the user selects in step 412 another attribute stored in the RPGS repository. Alternatively, the user can define or create a new attribute and store the attribute in the RPGS repository, which updates the attribute. Further, in step 416, the user selects a specification (including the specification name, description and value ranges) stored in the RPGS repository. In an embodiment, the RPGS repository includes the specification repository, as discussed with respect to FIG. 2. In step 418, the requirement pattern generator module is run in order to update a RelationMap, which is published in step 420. The updated RelationMap is stored in the RPGS repository 414, ending the process of forming a relationship requirement pattern in step 422. As such, the user can create or define RelationMaps, where each RelationMap represents a particular attribute having a particular specification, as described further herein below with respect to FIG. 9. Thus, an attribute can be paired with multiple specifications resulting in multiple RelationMaps.

Figure 5:
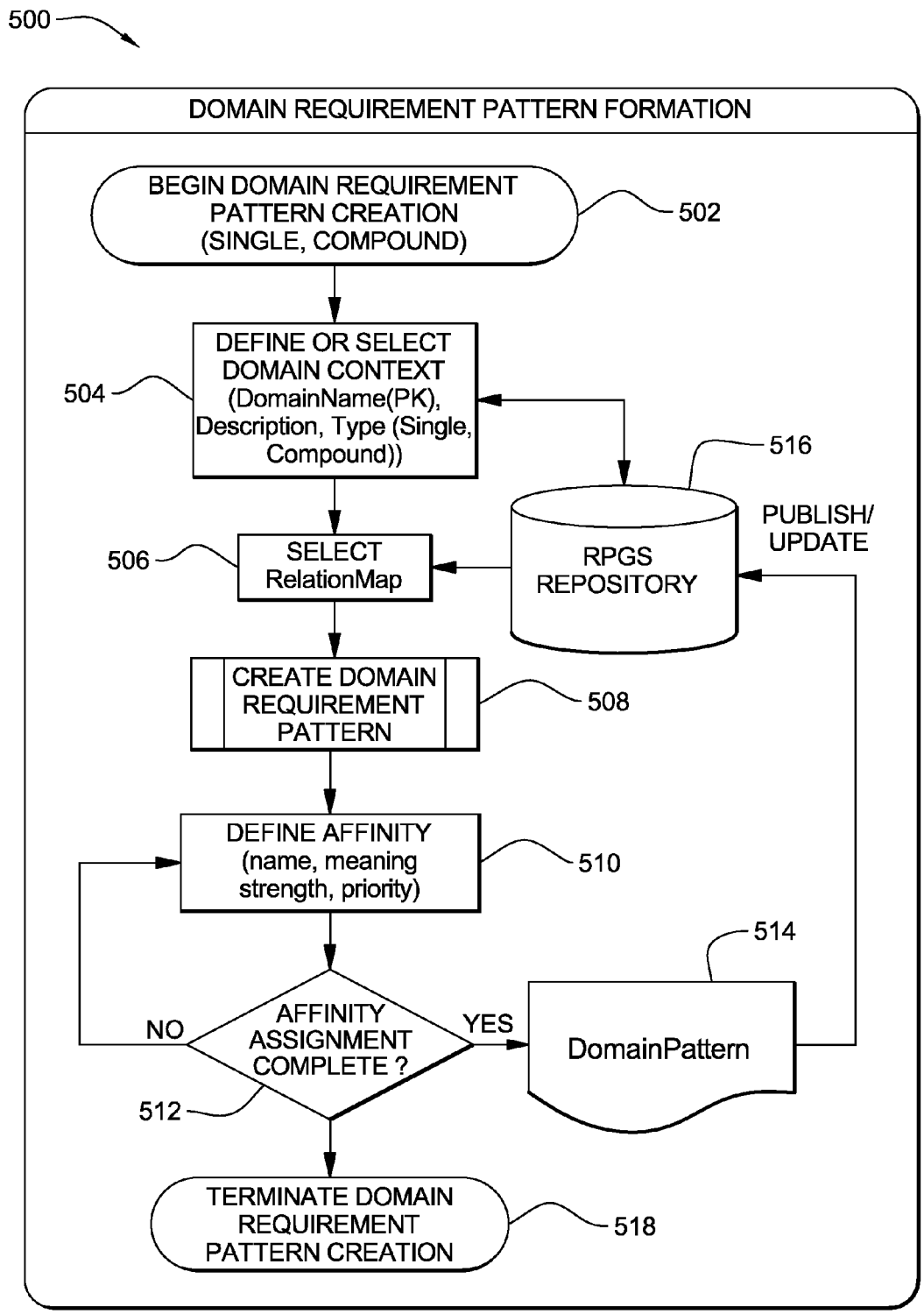
FIG. 5 depicts a flowchart outlining the steps for creating or forming a domain requirement pattern used for designing a solution, in accordance with an embodiment of the present invention.

Reference is now made to FIG. 5, which outlines the process 500 for forming a domain requirement pattern (also referred to as DomainPattern), in accordance with an embodiment of the invention. The method begins at step 502 when a user chooses to create a domain requirement pattern or to edit an existing domain requirement pattern using the requirement pattern generator tool or program or module, which further includes a domain requirement pattern generator module, as will be discussed further herein below with respect to FIG. 7. In step 504, a user defines or selects a domain context. If the domain context has been previously defined and stored, then the user selects the domain context, which in an embodiment is stored within the RPGS repository 516. However, if the domain context has not been defined the user defines the domain context in step 504, which includes the domain name, description and type (single domain or compound domain), as explained herein above with respect to FIG. 2. Further, the user selects in step 506 a RelationMap that is stored in an embodiment in the RPGS repository 516, as described herein above with respect to FIG. 4. In step 508, the domain requirement pattern generator module is run in order to create or update a domain requirement pattern. Further, in step 510, a user defines or assigns an Affinity between an attribute-specification pair, which includes name and affinity value (or AffinityVal, which provides an indication of meaning or affinity strength (strong affinity or weak affinity) and priority (yes or no)). For instance, it may be determined that for an attribute of customer data and a specification of data retention requirement that there is a strong relationship or affinity, which may dictate using a high availability solution for a platform, whereas, if there is no strong relationship between customer data and data retention requirement, which may dictate using any generic platform. Furthermore, in step 512, a determination is made as to whether or not the affinity assignment or definition is complete. If the affinity assignment is not complete, then the process returns to step 510, where the step of defining or assigning affinity between an attribute-specification pair is repeated, as necessary, until all affinity assignments are made. However, if the affinity assignment is complete, then in step 514, the domain requirement pattern generator module publishes a DomainPattern, which includes the DomainName, RelationMap and the AffinityVal (affinity value: meaning strength and priority). The DomainPattern is stored in the RPGS repository in step 516, ending the process of forming a domain requirement pattern in step 518.

Figure 6:
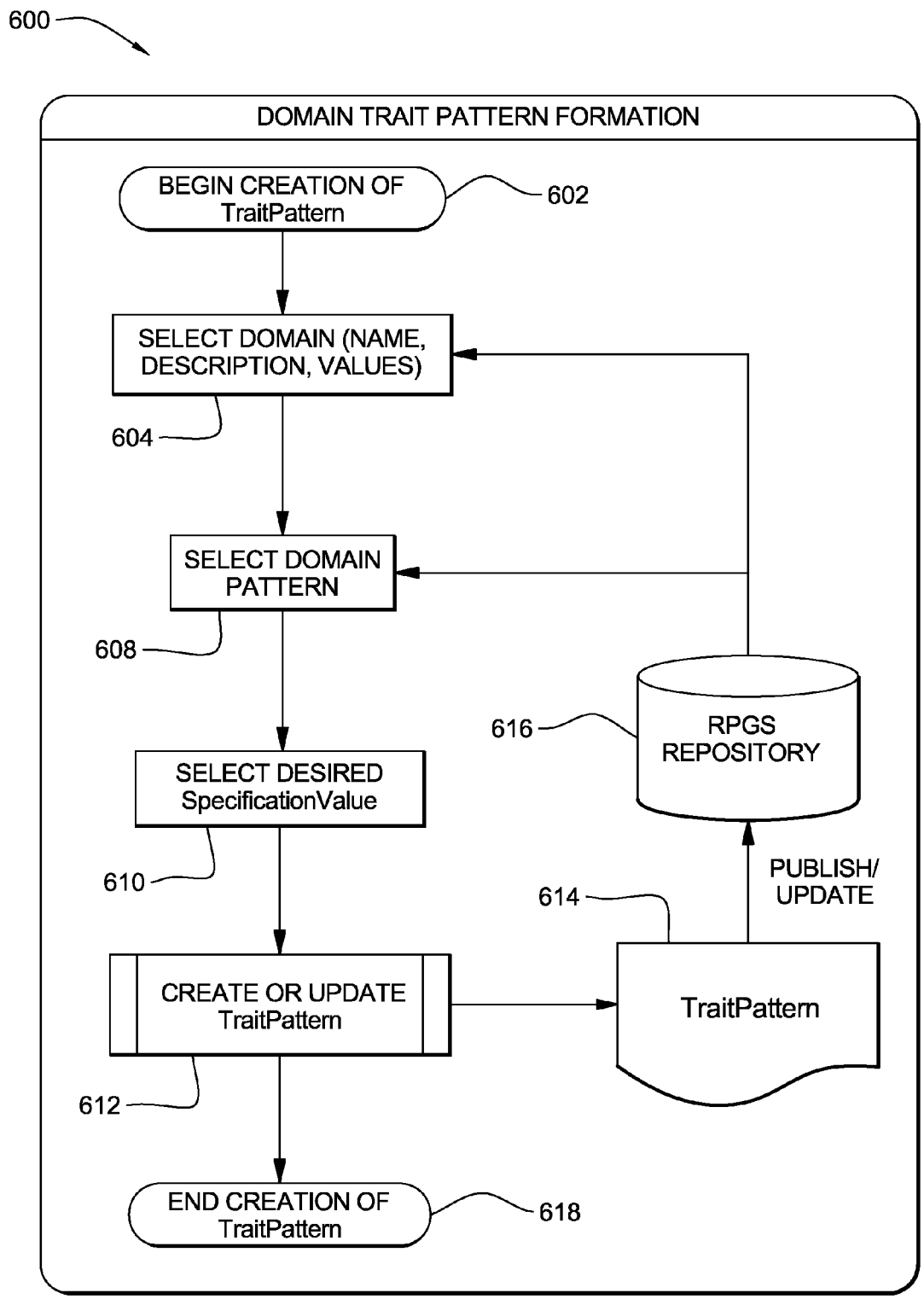
FIG. 6 depicts a flowchart outlining the steps for creating or forming a domain trait requirement pattern used for designing a solution, in accordance with an embodiment of the present invention.

Turning to FIG. 6, reference numeral 600 outlines the method steps for forming a domain trait requirement pattern, in accordance with an embodiment of the invention. The method begins at step 602 when a user chooses or selects to create a trait requirement pattern for a specific domain. In step 604, a user selects a domain that has been defined and stored in the RPGS repository 616. The domain includes the domain name, description and value. Further, the user selects in step 608 a domain requirement pattern, as discussed hereinabove with respect to FIG. 5. Furthermore, in step 610, the user selects a desired specification having a specific specification name (identified by a PK), a description and a select or particular specification value selected from the valid value ranges entered for a specification. In step 612, the trait requirement pattern generator module is run in order to create or update a trait requirement pattern for a domain selected. The trait requirement pattern generator module publishes a TraitPattern (also referred to as a RequirementTrait) in step 614, which includes the TraitName (having a PK assigned to the TraitName), DomainName (as defined, which includes the domain name, description and values), DomainPattern (as defined, which includes DomainName (identified by a PK), RelationMap (which includes the AttributeName (identified by a PK) and Description) and Spec (or Specification), as defined, which includes specification name, description and the specific value selected from the range of values possible. The TraitPattern is stored in the RPGS repository in step 616, ending the process of forming a domain trait requirement pattern in step 618.

In another embodiment, the invention provides a system for generating requirement patterns for designing a solution. The system comprises a user interface configured to receive requirements for designing a domain-specific solution based on a domain context defined, the requirements comprises a plurality of attributes defined and a plurality of specifications defined and a processor configured to execute processing functions and to coordinate a plurality of activities and events for designing the domain specific solution for the domain context defined. Further, the system comprises a requirements pattern generator module configured to use pattern matching techniques on the requirements received for creating relationship requirement patterns using relationship mappings formed between the plurality of attributes and the plurality of specifications and to create domain requirement patterns based on the domain context defined and using affinities defined for the plurality of relationship mappings formed for the domain specific solution, a trait pattern generator module configured to use pattern matching techniques to generate domain trait requirement patterns using the domain requirement patterns created and using specific specification values selected from a valid range of specification values assigned to one or more of the plurality of specifications defined based on the domain context defined for the domain specific solution and an interconnect module configured to interconnect each of the user interface, the processor, the requirements pattern generator module and the trait pattern generator module for enabling data exchange. The system further comprises a repository configured to store the plurality of attributes defined, the plurality of specifications defined, the domain context defined, the relationship requirement patterns created, the domain requirement patterns created and the domain trait requirement patterns generated. In an embodiment, the system comprises a domain definition module configured to receive input for defining the domain context that the domain specific solution is to be used in, a specification definition module configured to receive input for defining the plurality of specifications, including assigning the valid range of specification values for the one or more of the plurality of specifications and an attribute definition module configured to receive input for defining the plurality of attributes. In an embodiment, the one or more specifications of the plurality of specifications are mapped to an attribute of the plurality of attributes to form the relationship mappings. In an embodiment, the requirements pattern generator module is further configured to define the affinities for the plurality of relationship mappings formed and to establish affinity values for the affinities defined based on the domain context defined for creating the domain requirement patterns for the domain specific solution. In an embodiment, the trait pattern generator module is further configured to select the specific specification values from the valid range of specification values assigned for the one or more of the plurality of specifications and to use the specific specification values selected for generating the domain trait requirement patterns that dictate the domain specific solution.

Figure 7:
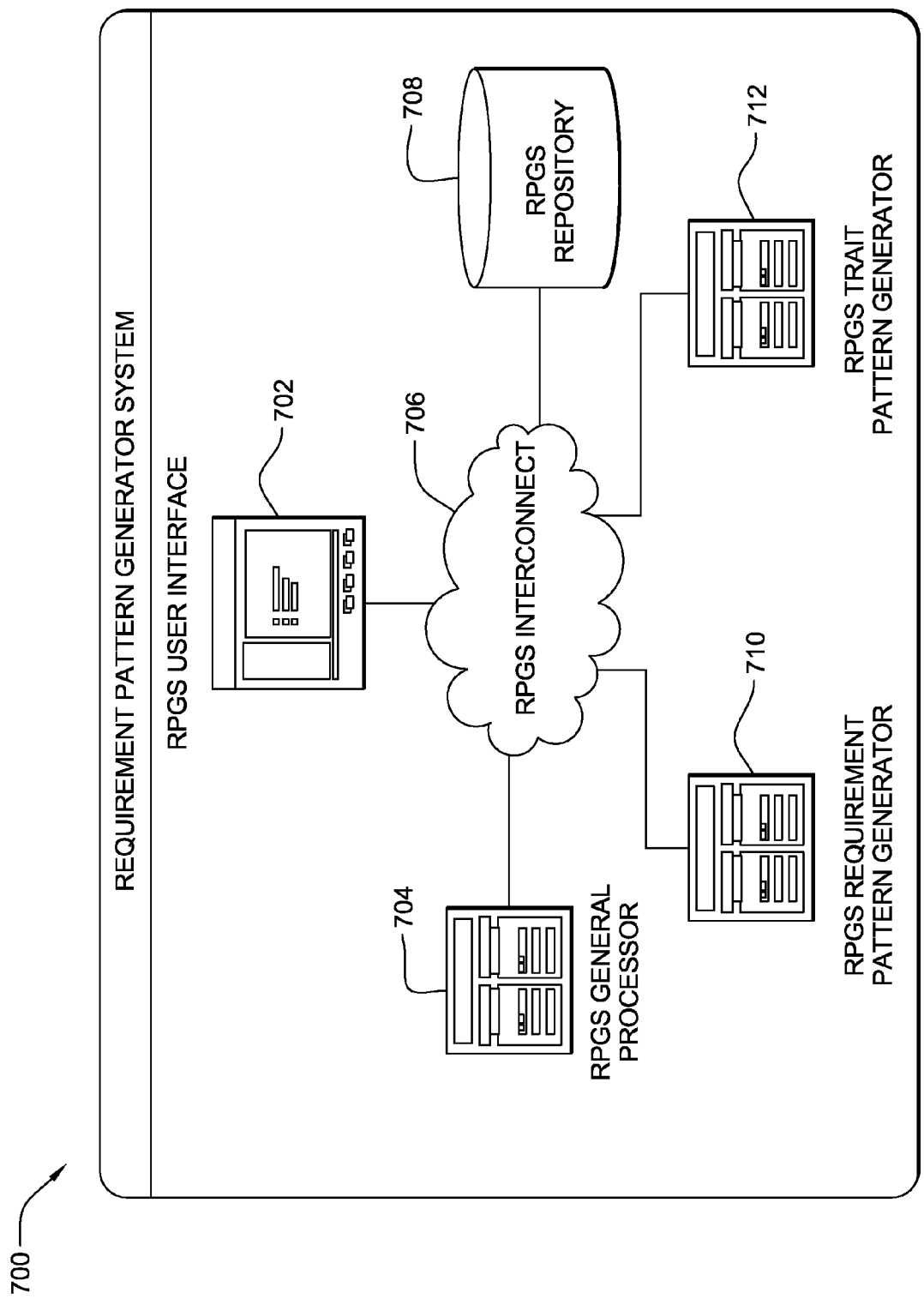
FIG. 7 is a schematic block diagram illustrating an embodiment of a requirement pattern generator (RPG) system for generating requirement relationships for designing a solution, in accordance with an embodiment of the present invention.
Figure 8:
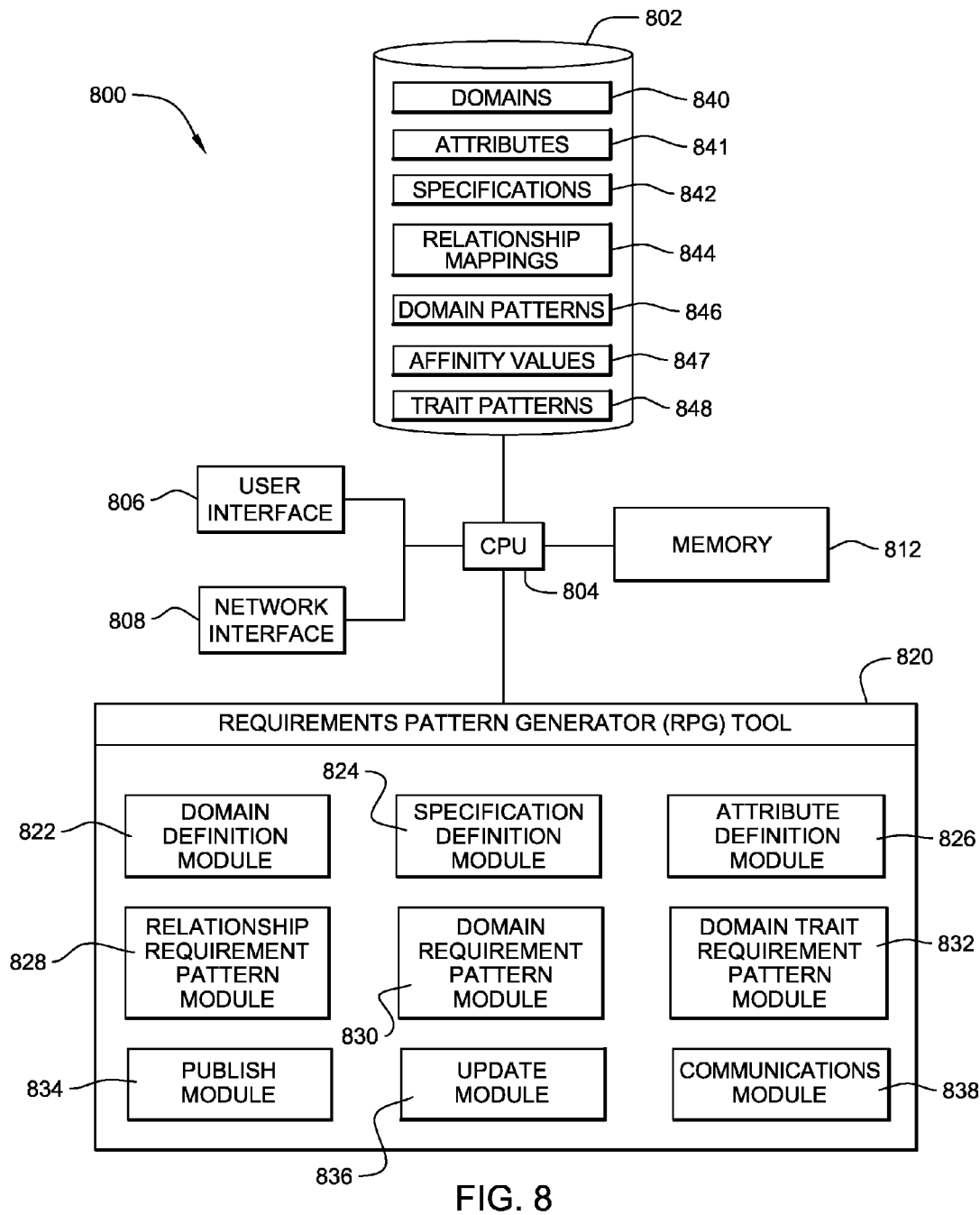
FIG. 8 is a schematic block diagram illustrating an embodiment of a requirement pattern generator (RPG) server having deployed thereon a requirement pattern generator (RPG) tool for generating requirement patterns or relationships for designing a solution, in accordance with an embodiment of the invention.

Reference is now made to FIGS. 7 and 8, which illustrate various embodiments of a requirement pattern generator system (RPGS) or simply referred to as system for generating requirement patterns for designing a solution, in accordance with an embodiment of the invention. Turning to FIG. 7, reference numeral 700 provides a schematic block diagram of an embodiment of a requirement pattern generator system (RPGS) 700 for generating requirement patterns when designing a solution. The RPGS 700 comprises a user interface (referred to as RPGS user interface) 702 configured to receive input from one or more users as to requirements, including domain, specifications and/or attributes, for designing a solution, for instance, requirements when designing an application. Further, the system 700 comprises a RPGS general processor or processing unit 704, which is configured to execute processing functions and to coordinate a plurality of activities and events when designing a solution. Furthermore, the RPGS 700 comprises a requirements pattern generator module 710 configured to use pattern matching techniques on the requirements received for creating relationship patterns from the requirements (specifications and attributes) received and for creating domain patterns from the requirements received and based on a selected domain. Additionally, the RPGS 700 comprises a trait pattern generator module 712 configured to define or create trait patterns or requirement traits based on the relationship patterns created and based on the domain patterns created for designing the solution, using a select specification value among the defined range of values. Also, the RPGS 700 further comprises a RPGS repository 708 configured to store the requirements received, the relationship patterns, the domain patterns created and the trait patterns formed or created. Furthermore, the RPGS 700 comprises a RPGS interconnect module 706 configured to interconnect each of the user interface 702, the general processor 704, the requirements pattern generator module 710, the trait pattern generator module 712 and the RPGS repository 708, such that, data can be exchanged between and among each of these components of the RPGS 700.

Reference is now made to FIG. 8, which illustrates an embodiment of a system for generating requirement relationships or patterns for designing a solution, in accordance with an embodiment of the invention. Turning to FIG. 8, FIG. 8 is a schematic block system diagram illustrating one embodiment of a system or server 800 that has deployed thereon a requirement pattern generator (RPG) tool or program or component 820 (also referred to herein as RPG tool or simply as "tool"), the RPG program or component or tool 820 being configured to generate requirement relationships or requirement patterns for designing a solution, such as, an application used in a particular technology or for designing a refrigerator used in a particular industry domain. Preferably, the system or server 800 includes a central processing unit (CPU) 804, a local storage device 802, a user interface 806, a network interface 808 and a memory 812. The CPU 804 is configured generally to execute operations within the system/server 800. The user interface 806, in one embodiment, is configured to allow a user, such as, a client, to interact with the system 800, including allowing input of requirements and input of definitions, such as, domain definitions, specification definitions and attribute definitions from a user and communicating output data to the user. The network interface 808 is configured, in one embodiment, to facilitate network communications of the system or server 800 over a communications channel of a network (reference numeral 706, shown in FIG. 7). In an embodiment, the created or formed Domains 840 (including the Domain name, description and value), as described with respect to FIG. 2, the defined attributes 841 (including attribute names and descriptions), as described with respect to FIG. 4 and the created or formed specifications 842 (including specification names, descriptions and valid value ranges), as described with respect to FIG. 3, are stored in storage system 802. Further, in an embodiment, the relationship mappings (RelationMaps) 844 created or formed (as described with respect to FIG. 4), the domain patterns or DomainPatterns 846 created or formed (as described with respect to FIG. 5), the defined affinity values 847 and the trait patterns or TraitPatterns 848 created or formed are stored in storage system 802. Alternatively, each of the DomainName, SpecificationName, RelationMap, DomainPattern and TraitPattern created or formed, along with the defined attributes and assigned affinity values may be stored in memory 812 or in a separate storage.

In one embodiment, as shown in FIG. 8, the requirement pattern generator (RPG) tool 820 which runs on the server or system 800 comprises a logic unit that contains a plurality of modules configured to functionally execute the necessary steps of generating requirement relationships or patterns for designing a solution. In particular, the RPG tool 820 includes a domain definition module 822, a specification definition module 824, an attribute definition module 826, a relationship requirement pattern module 828, a domain requirement pattern module 830, a domain trait requirement pattern module 832, a publish module 834, an update module 836 and a communications module 838. The domain definition module 822 is configured to receive input from one or more users with respect to defining a domain, including one or more sub-domains for designing a solution. The specification definition module 824 is configured to receive input from one or more users with respect to defining a domain, including one or more sub-domains pertaining to designing a solution. The attribute definition module 826 is configured to receive input from one or more users with respect to defining one or more attributes for designing a solution. The relationship requirement pattern module 828 is configured to create or form one or more relationship mappings (RelationMap) between attributes and specifications, described herein above with respect to FIG. 4 and further described herein below with respect to FIG. 9. The relationship requirement pattern module 828 uses information or data for a particular specification as defined in the specification definition module 824 and uses information or data for a particular attribute as defined in the attribute definition module 826. Further, the domain requirement pattern module 830 is configured to create or form domain requirement patterns or domain patterns for a specific domain (including any sub-domains) based on the relationship mapping created between attributes and specifications and using an affinity value assigned to a particular relationship mapping (which defines the level of priority or importance placed on a requirement relationship for a given domain, as described herein above with respect to FIG. 5) and described herein below with respect to FIG. 10. Furthermore, the domain trait requirement pattern module 832 is configured to create or form trait patterns for a specific domain (including any sub-domains) based on the relationship mapping created between attributes and specifications and also using a specification value from a valid range of specification values defined or assigned to each of the specifications (described herein above with respect to FIG. 6) and described herein below with respect to FIG. 11. The publish module 834 is configured to publish or issue each of the domain names 840, the specification names 842, relationship mappings 844, domain patterns 846 and trait patterns 848, which are sent, in an embodiment, to a repository or storage 802 within server 800. Alternatively, the information (definitions, mappings, patterns, etc.) may be stored in a storage or database system external to the server 800. Additionally, the update module 836 is configured to allow a user to update definitions in the domain definition module, the specification definition module and the attribute definition module (reference numerals 822, 824 and 826, respectively). Further, the update module 836 is configured to store, in an embodiment, the updated information in the storage 802. Again, the information may be stored in a storage or database system external to the server 800. Furthermore, the communications module 838 is configured to permit communication between the various modules of the requirement pattern generator tool 820 and other components, such as, the storage 802.

Reference is now made to FIGS. 9-11, which depict tables containing information or data elements used by the requirement pattern generator (RPG) tool. Turning to FIG. 9, reference numeral 900 depicts a table illustrating the creation of relationship mappings for M number of attributes by N number of specifications by the RPG tool. As shown, each of the rows in the table 900 contains attribute names, for instance, Attribute_1, reference numeral 902, Attribute_2, reference numeral 904 through Attribute_M, reference numeral 950. Further, each of the columns in table 900 contains specification names, for instance, Specification_1, reference numeral 952, Specification_2, reference numeral 954 through Specification_M, reference numeral 990. As shown in an embodiment in FIG. 9, the relationship mappings are represented by a multi-dimensional matrix/array whose data elements are created by the concatenation of ordered pairs or relationship mappings (RM) of attributes and specifications (AttributeName, SpecificationName) called "AttriSpec", where "AttriSpec" is converted to a number and stored within the matrix for each ordered pair of AttributeName and SpecificationName, where each element of the matrix is then normalized by using the determinate value of the matrix. For example, $RM_{a1,s1}$ (reference numeral 992) represents the relationship mapping for Attribute_1 (reference numeral 902) and Specification_1 (reference numeral 952), where "Y" (yes) represents that there is a relationship between Attribute_1 and Specification_1. Further, $RM_{a1,s1}$ (reference numeral 992) represents a determinate value that is stored in the cell reference numeral 992, as mentioned above.

Turning to FIG. 10, reference numeral 1000 depicts a table illustrating the creation of a domain requirement pattern by the RPG tool, using the relationship mapping data of table 9. As shown, each of the rows in the table 1000 contains attribute names, for instance, Attribute_1, reference numeral 1002, Attribute_2, reference numeral 1004 through Attribute_M, reference numeral 1050. Further, each of the columns in table 1000 contains specification names, for instance, Specification_1, reference numeral 1052, Specification_2, reference numeral 1054 through Specification_M, reference numeral 1090. As shown in an embodiment in FIG. 10, the domain requirement patterns are represented by a multi-dimensional matrix/array whose data elements are created by applying an Affinity Value (AV) to each element of the matrix to define the level of priority or importance placed on the requirement relationship or relationship mapping (as described in FIG. 9) for a given domain in order to create a domain requirement relationship pattern. For example, AV*RM$_{a1,s1}$ (reference numeral 1092) represents the domain requirement pattern using the relationship mapping for Attribute_1 (reference numeral 1002) and Specification 1 (reference numeral 1052) and an affinity value for Attribute_1 and Specification_1. Further, the value stored for AV*RM$_{a1,s1}$ (reference numeral 1092) represents a product of the AV and the RM$_{a1,s1}$. As such, a domain requirement pattern utilizes the degree of affinity between attributes and specifications for a requirement relationship pattern (described herein above with respect to FIG. 9), based on a domain context.

Turning to FIG. 11, reference numeral 1100 depicts a table illustrating the creation of a domain trait requirement pattern by the RPG tool, using the relationship mapping data of table 9 and specific specification values of interest to a user. As shown, each of the rows in the table 1100 contains attribute names, for instance, Attribute_1, reference numeral 1102, Attribute_2, reference numeral 1104 through Attribute_M, reference numeral 1150. Further, each of the columns in table 1100 contains specification names, for instance, Specification_1, reference numeral 1152, Specification_2, reference numeral 1154 through Specification_M, reference numeral 1190. As shown in an embodiment in FIG. 11, the domain trait requirement patterns or requirements trait patterns are represented by a multi-dimensional matrix/array whose data elements are created by the concatenation of the ordered pairs of "AttriSpec" (described herein above with respect to FIG. 9) and "SpecVal" (specific values from the ranges defined and chosen for a specification), called "TraitValue", where "TraitValue" is converted to a number and stored within the matrix for each ordered pair of AttriSpec and SpecValue, where each element of the matrix is then normalized by using the determinate value of the matrix. For example, TV$_{a1,s1}$ (reference numeral 1192) is created using the relationship mappings and affinity values selected for Attribute_1 and Specification_1 and using specific values for Specification_1 for creating a unique requirement pattern instance, namely, a trait pattern, which leverages the domain requirement relationship pattern described herein above with respect to FIG. 10.

In yet another embodiment, the invention provides a computer program product for generating requirement patterns when designing a solution. The computer program product comprises a computer readable or computer-usable medium, which provides program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. Preferably, the computer storage medium can be an electronic, magnetic, optical, electromagnetic, infrared, or semiconductor system (or apparatus or device) or a propagation medium. Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Further, preferably, network medium can comprise of transmission devices on a network, such as, cables, routers, switches and/or network adapter cards.

The computer program product further comprises first program instructions to determine, using pattern matching techniques, relationship requirement patterns from requirements inputted for designing a domain specific solution, the requirements inputted including a domain context, a plurality of attributes and a plurality of specifications, the first program instructions including instructions to form relationship mappings between the plurality of attributes and the plurality of specifications and second program instructions to define affinities for the relationship mappings formed and applying the affinities defined to create domain requirement patterns using the domain context, the second program instructions including instructions to establish affinity values for the affinities defined based on the domain context for creating the domain requirement patterns. Further, the computer program product comprises third program instructions to generate domain trait requirement patterns using the domain requirement patterns created and using specific specification values selected from a valid range of specification values assigned to one or more of the plurality of specifications and fourth program instructions to store in a repository the domain context, the plurality of attributes, the plurality of specifications, the affinities, the relationship requirements patterns determined, the domain requirement patterns created and the domain trait requirement patterns generated, wherein the domain trait requirement patterns generated dictate the domain specific design for the solution. In an embodiment, the first program instructions include instructions to define the domain context, the plurality of attributes and the plurality of specifications and to map one or more specifications of the plurality of specifications to each attribute of the plurality of attributes to form the relationship mappings used to determine the relationship requirement patterns. In an embodiment, the third program instructions include instructions to select the specific specification values from the valid range of specification values assigned for the one or more specifications of the plurality of specifications and to use the specific specification values selected for generating the domain trait requirement patterns that dictate the domain specific solution. In an embodiment, a relationship requirement pattern determined, a domain requirement pattern generated and a domain trait requirement pattern generated are each assigned a primary key index represented and stored as a string. In an embodiment, the domain context defined comprises one or more sub-domains that are defined and stored within the repository. Preferably, the first, second, third and fourth program instructions are recorded on the computer readable medium.

Figure 12:
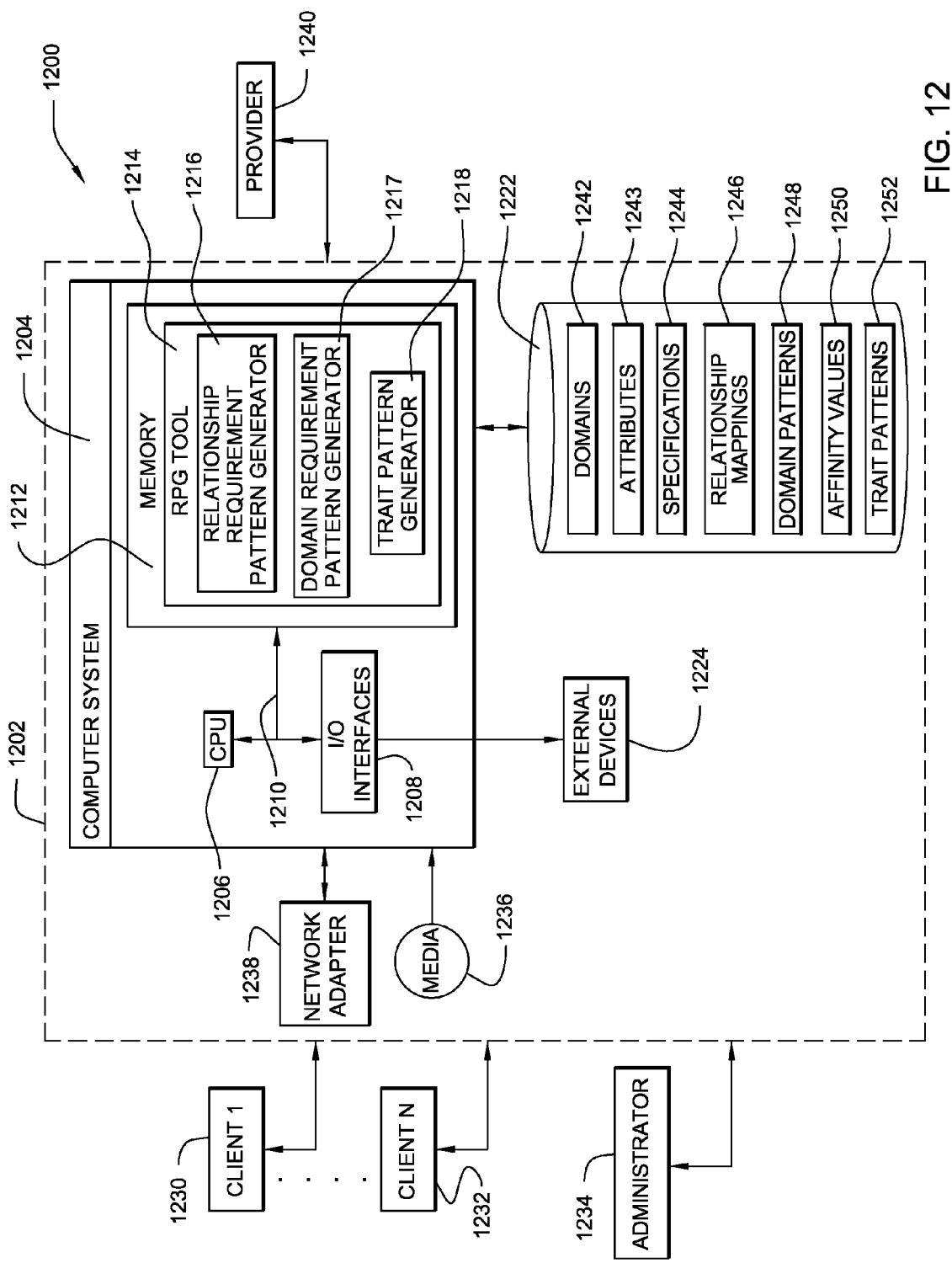
FIG. 12 is a schematic block diagram illustrating an embodiment of a network infrastructure comprising a computer program product for generating requirement patterns or relationships for designing a solution, in accordance with an embodiment of the present invention.

Referring now to FIG. 12, there is illustrated a computer infrastructure 1200 that provides a computer program product, the requirement pattern generator (RPG) tool 1214, for managing connection requests received for generating requirement relationships or patterns for designing a solution, in accordance with an embodiment of the present invention. The computer program product comprises a computer readable or computer-usable medium, which provides program code, namely, the RPG tool 1214, for use by or in connection with a computer or any instruction execution system. The RPG tool or program 1214 can be loaded, for instance, into memory 1212 of computer system 1204 from a computer readable media 1236, such as, a magnetic tape or disk, optical media, DVD, memory stick, semiconductor memory, etc. or downloaded from the Internet via a network adapter 1238, for instance, a TCP/IP adapter card. As depicted in FIG. 12, system 1200 includes a computer infrastructure 1202, namely, a requirement pattern generator infrastructure 1202, which is intended to represent any type of computer architecture that is maintained in a secure environment (i.e., for which access control is enforced). As shown, infrastructure 1202 includes a computer system 1204 that typically represents a server or system 1204 or the like that includes an RPG tool or program 1214 configured to generate requirement relationships or patterns for designing a solution. It should be understood, however, that although not shown, other hardware and software components (e.g., additional computer systems, switches, routers, firewalls, etc.) could be included in infrastructure 1202.

In general, one or more clients, for instance, client 1 (reference numeral 1230) through client N (reference numeral 1232) can access the server or system 1204, which has deployed thereon the requirement pattern generator (RPG) tool 1214, which implements the invention. The RPG tool or program 1214 is run on the system or server 1204 to generate requirement relationships or patterns for designing a solution based on requirements inputted by a client 1 through N (reference numerals 1230 through 1232). As shown in FIG. 12, the server or system 1204 (which has implemented thereon the RPG tool 1214) is shown in communication with a general storage or file system or database or repository 1222, which in an embodiment stores the domains 1242 (which includes domain names, descriptions and values), specifications 1244 (including names, descriptions, value ranges), relationship mappings 1246 that are generated using the relationship requirement pattern generator 1216, the domain patterns 1248 that are generated using the domain requirement pattern generator 1217, affinity values 1250 that are defined and trait patterns 1252 that are generated using the trait pattern generator 1218. In an embodiment, clients 1 through N, reference numerals 1230 through 1232, respectively) access the server or system 1204 over a network via interfaces (e.g., web browsers) loaded on a client, for example, a personal computer, a laptop, a handheld device, etc. In the case of the latter, the network can be any type of network, such as, the Internet, a local area network (LAN), a wide area network (WAN), a virtual private network (VPN), etc. In any event, communication with infrastructure 1202 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 1202. It should be understood that under the present invention, infrastructure 1202 could be owned and/or operated by a party such as provider 1240, or by an independent entity, which provides a service of generating requirement relationships or patterns for designing a solution utilizing the infrastructure 1202. Regardless, use of infrastructure 1202 and the teachings described herein could be offered to the parties on a subscription or fee-basis. In either scenario, an administrator 1234 could support and configure infrastructure 1202, for instance, for upgrading the RPG tool 1214 deployed on the server or system 1204 and/or updating information, such as, for adjusting the predefined or preset threshold or maximum number of allowable connections for a requestor.

The server 1204 is shown to include a CPU (hereinafter "processing unit 1206"), a memory 1212, a bus 1210 and input/output (I/O) interfaces 1208. Further, the server 1204 is shown in communication with external I/O devices/resources 1224 and storage system 1222. In general, processing unit 1206 executes computer program code, such as the RPG tool 1214, including the relationship requirement pattern generator 1216, the domain requirement pattern generator 1217 and the trait pattern generator 1218, as described herein above with respect to FIGS. 4 through 6. While executing computer program code, the processing unit 1206 can read and/or write data to/from memory 1212, storage system 1222 and/or I/O interfaces 1208. For instance, in one embodiment, the RPG tool 1214 stores the domain patterns 1248 and trait patterns 1252 created in storage 1222. Similarly, the RPG tool 1214 stores the domains 1242 (as defined by clients), attributes 1243 (as defined by clients), specifications 1244 (as defined by clients), relationship mappings 1246 that are formed and affinity values 1250 that are determined in storage 1222. Bus 1210 provides a communication link between each of the components in computer system 1200, such that information can be communicated within the infrastructure 1202. External devices 1224 can comprise any devices (e.g., keyboard, pointing device, display, etc.) that enable a user and/or administrator to interact with computer system 1200 and/or any devices (e.g., network card, modem, etc.) that enable server 1204 to communicate with one or more other computing devices.

Computer infrastructure 1202 is only illustrative of various types of computer infrastructures for implementing the invention. For example, in an embodiment shown, computer infrastructure 1202 comprises two or more computing devices (e.g., a server cluster) that communicate over a network to perform the various process steps of the invention. Moreover, computer system 1200 is only representative of various possible computer systems that can include numerous combinations of hardware. To this extent, in other embodiments, computer system 1200 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 1206 may comprise a single processing unit, or be distributed across one or more processing units in one or more locations, e.g., on a client and server. Similarly, memory 1212 and/or storage system 1222 can comprise any combination of various types of data storage and/or transmission media that reside at one or more physical locations. Further, I/O interfaces 1208 can comprise any system for exchanging information with one or more external devices 1224. Still further, it is understood that one or more additional components (e.g., system software, math co-processing unit, etc.) not shown in FIG. 12 can be included in computer system 1200. However, if computer system 1200 comprises a handheld device or the like, it is understood that one or more external devices 1224 (e.g., a display) and/or storage system(s) 1222 could be contained within computer system 1204 and not externally as shown. Storage system 1222 can be any type of system (e.g., a database) capable of providing storage for information under the present invention, such as, the attributes 1243 and the specifications 1244 utilized by the RPG tool 1214. To this extent, storage system 1222 could include one or more storage devices, such as, a magnetic disk drive or an optical disk drive. In another embodiment, storage system 1222 includes data distributed across, for example, a local area network (LAN), wide area network (WAN) or a storage area network (SAN) (not shown). Although not shown, additional components, such as cache memory, communication systems, system software, etc., may be incorporated into computer system 1200.

Further, in yet another embodiment, the invention provides a process for deploying computing infrastructure comprising integrating computer-readable code into a computing system, wherein the code in combination with the computing system is capable of performing a process for generating requirement patterns when designing a solution. The process comprises receiving requirements for designing a solution based on a domain context defined, the requirements received comprises a defined set of attributes and a defined set of specifications for designing the solution based on the domain context defined and determining, using pattern matching techniques, relationship requirement patterns using relationship mappings formed between the defined set of specifications and the defined set of attributes inputted. Further, the process comprises defining affinities for the plurality of relationship mappings formed, creating domain requirement patterns using the domain context defined and using the relationship mappings formed and the affinities defined, generating domain trait requirement patterns using the domain requirement patterns created and using selected values assigned for the defined set of specifications mapped, wherein the domain trait requirement patterns generated dictate a domain specific design for the solution and storing in a repository the defined set of attributes, the defined set of specifications, the relationship requirement patterns determined, the domain requirement patterns created and the domain trait requirement patterns generated. In an embodiment, the receiving step further comprises defining the domain context that the solution is to be used in, the domain context defined including one or more sub-domains, assigning a valid range of specification values for each of the defined set of specifications inputted for the domain context defined that the solution is to be used in, defining the attributes based on the domain context defined for the solution and storing the domain context defined, the valid range of specification values assigned and the attributes defined in the repository. In an embodiment, the determining step further comprises mapping the one or more specifications to each attribute of the defined set of attributes inputted to form relationship mappings and storing the relationship mappings formed in the repository. In an embodiment, the defining affinities step further comprises establishing affinity values for the affinities defined based on the domain context defined and the relationship requirement patterns determined and storing the affinity values established in the repository. In an embodiment, a relationship requirement pattern determined, a domain requirement pattern generated and a domain trait requirement pattern generated are each assigned a primary key index represented and stored as a string.

Accordingly, any of the components of the present invention as shown in FIG. 12 can be deployed, managed, serviced by a service provider 1240 who offers to provide a service of generating requirement patterns when designing a solution to one or more clients. Preferably, the invention provides a business method that performs the process steps of the invention on a subscription, advertising and/or fee basis. In particular, a service provider, such as a solution integrator could offer to generate requirement patterns for designing a solution for a client. In this case, the service provider can, for instance, create, maintain and support a computer infrastructure that performs the process steps of the invention for one or more customers. In return, the service provider can receive payment from the client or clients under a subscription and/or fee agreement and/or the service provider can receive payment from the sale or advertising of content to one or more third parties.

The foregoing descriptions of specific embodiments of the present invention have been presented for the purpose of illustration and description. They are not intended to be exhaustive or to limit the invention to the precise forms disclosed and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for generating requirement patterns for designing a solution based on a domain context, said method comprising the steps of:
   inputting, into a pattern tool, requirements for designing a solution based on a domain context defined, said requirements inputted comprising a defined set of attributes and a defined set of specifications for designing said solution based on said domain context defined;
   determining relationship requirement patterns using relationship mappings formed between said defined set of specifications and said defined set of attributes inputted;
   defining affinities for said plurality of relationship mappings formed;
   creating domain requirement patterns using said domain context defined and using said relationship mappings formed and said affinities defined; and
   generating domain trait requirement patterns using said domain requirement patterns created and using selected values assigned for said defined set of specifications mapped, wherein said domain trait requirement patterns generated dictate a domain specific design for said solution.

2. The method according to claim 1, further comprising the step of:
   storing in a repository, said defined set of attributes, said defined set of specifications, said relationship requirement patterns determined, said domain requirement patterns created and said domain trait requirement patterns generated.

3. The method according to claim 2, wherein said inputting step further comprises the steps of:
   defining said domain context that said solution is to be used in, said domain context defined comprising one or more sub-domains; and
   storing said domain context defined in said repository.

4. The method according to claim 3, wherein said inputting step further comprises the steps of:
   assigning a valid range of specification values for each of said defined set of specifications inputted for said domain context that said solution is to be used in; and
   storing said valid range of specification values assigned in said repository.

5. The method according to claim 4, wherein said inputting step further comprises the steps of:

defining said attributes based on said domain context defined for said solution; and storing said attributes defined in said repository.

6. The method according to claim 5, wherein said determining step further comprises the steps of:

mapping one or more specifications of said defined set of specifications to each attribute of said defined set of attributes inputted to form said relationship mappings; and storing said relationship mappings formed in said repository.

7. The method according to claim 6, wherein said defining affinities step further comprises the steps of:

establishing affinity values for said affinities defined based on said domain context defined and said relationship requirement patterns determined; and storing said affinity values established in said repository.

8. The method according to claim 7, wherein a relationship requirement pattern determined is assigned a primary key index represented and stored as a string, wherein a domain requirement pattern generated is assigned a primary key index represented and stored as a string and wherein a domain trait requirement pattern generated is assigned a primary key index represented and stored as a string.

9. A system for generating requirement patterns for designing a domain specific solution, comprising:

a user interface configured to receive requirements for designing a domain-specific solution based on a domain context defined, said requirements comprising a plurality of attributes defined and a plurality of specifications defined;

a processor configured to execute processing functions and to coordinate a plurality of activities and events for designing said domain specific solution for said domain context defined;

a requirements pattern generator module configured to use pattern matching techniques on said requirements received for creating relationship requirement patterns using relationship mappings formed between said plurality of attributes and said plurality of specifications and to create domain requirement patterns based on said domain context defined and using affinities defined for said plurality of relationship mappings formed for said domain specific solution;

a trait pattern generator module configured to use pattern matching techniques to generate domain trait requirement patterns using said domain requirement patterns created and using specific specification values selected from a valid range of specification values assigned to one or more of said plurality of specifications defined based on said domain context defined for said domain specific solution; and an interconnect module configured to interconnect each of said user interface, said processor, said requirements pattern generator module and said trait pattern generator module for enabling data exchange.

10. The system according to claim 9, further comprising:

a repository configured to store said plurality of attributes defined, said plurality of specifications defined, said domain context defined, said relationship requirement patterns created, said domain requirement patterns created and said domain trait requirement patterns generated.

11. The system according to claim 10, further comprising:

a domain definition module configured to receive input for defining said domain context that said domain specific solution is to be used in;

a specification definition module configured to receive input for defining said plurality of specifications, including assigning said valid range of specification values for said one or more of said plurality of specifications; and an attribute definition module configured to receive input for defining said plurality of attributes.

12. The system according to claim 11, wherein one or more specifications of said plurality of specifications are mapped to an attribute of said plurality of attributes to form said relationship mappings.

13. The system according to claim 12, wherein said requirements pattern generator module is further configured to define said affinities for said plurality of relationship mappings formed and to establish affinity values for said affinities defined based on said domain context defined for creating said domain requirement patterns for said domain specific solution.

14. The system according to claim 13, wherein said trait pattern generator module is further configured to select said specific specification values from said valid range of specification values assigned for said one or more of said plurality of specifications and to use said specific specification values selected for generating said domain trait requirement patterns that dictate said domain specific solution.

15. A computer program product for generating requirement patterns used for designing a domain specific solution, said computer program product comprising:

a non-transitory computer readable medium;

first program instructions to determine, using pattern matching techniques, relationship requirement patterns from requirements inputted for designing a domain specific solution, said requirements inputted including a domain context, a plurality of attributes and a plurality of specifications, said first program instructions including instructions to form relationship mappings between said plurality of attributes and said plurality of specifications;

second program instructions to define affinities for said relationship mappings formed and applying said affinities defined to create domain requirement patterns using said domain context, said second program instructions including instructions to establish affinity values for said affinities defined based on said domain context for creating said domain requirement patterns;

third program instructions to generate domain trait requirement patterns using said domain requirement patterns created and using specific specification values selected from a valid range of specification values assigned to one or more of said plurality of specifications, wherein said domain trait requirement patterns generated dictate said domain specific design for said solution, wherein said first, second and third program instructions are recorded on said computer readable medium.

16. The computer program product according to claim 15, further comprising:

fourth program instructions to store in a repository said domain context, said plurality of attributes, said plurality of specifications, said affinities, said relationship requirements patterns determined, said domain requirement patterns created and said domain trait requirement patterns generated, wherein said fourth program instructions are recorded on said computer readable medium.

17. The computer program product according to claim 16, wherein said first program instructions include instructions to define said domain context, said plurality of attributes and said plurality of specifications and to map one or more specifications of said plurality of specifications to each attribute of said plurality of attributes to form said relationship mappings used to determine said relationship requirement patterns.

18. The computer program product according to claim 17, wherein said third program instructions include instructions to select said specific specification values from said valid range of specification values assigned for said one or more specifications of said plurality of specifications and to use said specific specification values selected for generating said domain trait requirement patterns that dictate said domain specific solution.

19. The computer program product according to claim 18, wherein a requirement relationship determined is assigned a primary key index represented and stored as a string, wherein a domain requirement pattern generated is assigned a primary key index represented and stored as a string and wherein a domain trait requirement pattern generated is assigned a primary key index represented and stored as a string.

20. The computer program product according to claim 19, wherein said domain context defined comprises one or more sub-domains that are defined and stored within said repository.

21. A process for deploying computing infrastructure comprising integrating computer-readable code into a computing system, wherein said code in combination with said computing system is capable of performing a process for designing a domain specific solution, said process comprising:
  receiving requirements for designing a solution based on a domain context defined, said requirements received comprising a defined set of attributes and a defined set of specifications for designing said solution based on said domain context defined;
  determining, using pattern matching techniques, relationship requirement patterns using relationship mappings formed between said defined set of specifications and said defined set of attributes inputted;
  defining affinities for said plurality of relationship mappings formed;
  creating domain requirement patterns using said domain context defined and using said relationship mappings formed and said affinities defined;
  generating domain trait requirement patterns using said domain requirement patterns created and using selected values assigned for said defined set of specifications mapped, wherein said domain trait requirement patterns generated dictate a domain specific design for said solution; and
  storing in a repository said defined set of attributes, said defined set of specifications, said relationship requirement patterns determined, said domain requirement patterns created and said domain trait requirement patterns generated.

22. The process according to claim 21, wherein said receiving step further comprises the steps of:
  defining said domain context that said solution is to be used in, said domain context defined including one or more sub-domains;
  assigning a valid range of specification values for each of said defined set of specifications inputted for said domain context defined that said solution is to be used in;
  defining said attributes based on said domain context defined for said solution; and
  storing said domain context defined, said valid range of specification values assigned and said attributes defined in said repository.

23. The process according to claim 22, wherein said determining step further comprises the steps of:
  mapping said one or more specifications to said each attribute of said defined set of attributes inputted to form relationship mappings; and
  storing said relationship mappings formed in said repository.

24. The process according to claim 23, wherein said defining affinities step further comprises the steps of:
  establishing affinity values for said affinities defined based on said domain context defined and said relationship requirement patterns determined; and
  storing said affinity values established in said repository.

25. The process according to claim 24, wherein a relationship requirement pattern determined is assigned a primary key index represented and stored as a string, wherein a domain requirement pattern generated is assigned a primary key index represented and stored as a string and wherein a domain trait requirement pattern generated is assigned a primary key index represented and stored as a string.

* * * * *